(12) United States Patent
Naeyaert et al.

(10) Patent No.: US 11,820,108 B2
(45) Date of Patent: Nov. 21, 2023

(54) FLOOR PANEL AND METHODS FOR MANUFACTURING FLOOR PANELS

(71) Applicant: FLOORING INDUSTRIES LIMITED, SARL, Bertrange (LU)

(72) Inventors: Christophe Naeyaert, Jabbeke (BE); Pieter-Jan Sabbe, Merelbeke (BE)

(73) Assignee: FLOORING INDUSTRIES LIMITED, SARL, Bertrange (LU)

( * ) Notice: Subject to any disclaimer, the term of this patent is extended or adjusted under 35 U.S.C. 154(b) by 0 days.

(21) Appl. No.: 17/859,553

(22) Filed: Jul. 7, 2022

(65) Prior Publication Data

US 2022/0332096 A1 Oct. 20, 2022

Related U.S. Application Data

(63) Continuation of application No. 16/960,399, filed as application No. PCT/IB2018/060452 on Dec. 20, 2018, now Pat. No. 11,413,852.

(30) Foreign Application Priority Data

Jan. 8, 2018 (BE) .................................... 2018/5009
Oct. 30, 2018 (BE) .................................... 2018/5751

(51) Int. Cl.
*B32B 21/00* (2006.01)
*B32B 21/04* (2006.01)
(Continued)

(52) U.S. Cl.
CPC .............. *B32B 21/042* (2013.01); *B32B 3/06* (2013.01); *B32B 5/16* (2013.01); *B32B 7/12* (2013.01);
(Continued)

(58) Field of Classification Search
CPC .......... E04F 15/02033; E04F 15/02038; E04F 15/107; E04F 15/102; E04F 2201/042;
(Continued)

(56) References Cited

U.S. PATENT DOCUMENTS

| 1,854,071 A | 4/1932 | Schacht |
| 2,457,256 A | 12/1948 | Melton et al. |

(Continued)

FOREIGN PATENT DOCUMENTS

| DE | 10245914 A1 | 4/2004 |
| DE | 202013012020 U1 | 2/2015 |

(Continued)

OTHER PUBLICATIONS

International Search Report and Written Opinion from PCT Application No. PCT/IB2018/060452, dated Apr. 8, 2019.

(Continued)

*Primary Examiner* — Chi Q Nguyen
(74) *Attorney, Agent, or Firm* — WORKMAN NYDEGGER

(57) ABSTRACT

A floor panel with a substrate and a decorative layer of wood veneer with a thickness of 1 millimeter or less and provided on the substrate. The decorative layer is provided on the substrate by means of a glue layer which is situated between the substrate and the decorative layer. The glue layer comprises hard particles with an average particle size which is at least one third of the thickness of the wood veneer. Methods for manufacturing such floor panels are provided.

14 Claims, 5 Drawing Sheets

(51) Int. Cl.
  *B32B 3/06* (2006.01)
  *B32B 5/16* (2006.01)
  *B32B 7/12* (2006.01)
  *B32B 21/02* (2006.01)
  *B32B 21/06* (2006.01)
  *B32B 21/12* (2006.01)
  *B32B 21/14* (2006.01)
  *E04F 15/02* (2006.01)
  *E04F 15/04* (2006.01)

(52) U.S. Cl.
  CPC .............. *B32B 21/02* (2013.01); *B32B 21/06* (2013.01); *B32B 21/12* (2013.01); *B32B 21/14* (2013.01); *E04F 15/02038* (2013.01); *E04F 15/045* (2013.01); *B32B 2260/026* (2013.01); *B32B 2260/046* (2013.01); *B32B 2264/1021* (2020.08); *B32B 2264/1022* (2020.08); *B32B 2264/1023* (2020.08); *B32B 2307/412* (2013.01); *B32B 2307/414* (2013.01); *B32B 2307/554* (2013.01); *B32B 2307/72* (2013.01); *B32B 2451/00* (2013.01); *B32B 2471/00* (2013.01); *E04F 2201/0138* (2013.01); *E04F 2201/0153* (2013.01); *E04F 2201/023* (2013.01); *E04F 2201/043* (2013.01); *E04F 2201/0535* (2013.01); *E04F 2201/0552* (2013.01)

(58) Field of Classification Search
  CPC ......... E04F 2201/0107; E04F 2201/03; E04F 2201/0552; E04F 2201/023; E04F 2201/0535; E04F 2201/0146; E04F 2201/043; E04F 2201/0547; E04F 2201/0153; E04F 2201/0138; B32B 21/042; B32B 21/14; B32B 21/00; B32B 37/10; B32B 37/12; B32B 37/1284
  USPC .. 52/592.1, 592.3, 592.2, 578, 588.1, 309.1, 52/309.3
  See application file for complete search history.

(56) References Cited

U.S. PATENT DOCUMENTS

| | | | |
|---|---|---|---|
| 5,755,068 A | 5/1998 | Ormiston | |
| 6,769,219 B2 | 8/2004 | Schwitte et al. | |
| 6,880,307 B2 | 4/2005 | Schwitte et al. | |
| 10,233,655 B2 | 3/2019 | Meersseman et al. | |
| 10,442,164 B2 | 10/2019 | Schulte | |
| 10,711,453 B1 | 7/2020 | Jordan et al. | |
| 10,731,682 B1 * | 8/2020 | Caselli | E04F 15/02033 |
| 10,828,881 B2 | 11/2020 | Bergelin et al. | |
| 10,857,765 B2 | 12/2020 | Schulte | |
| 10,967,608 B2 | 4/2021 | Pervan | |
| 11,413,852 B2 * | 8/2022 | Naeyaert | B32B 21/06 |
| 2002/0170258 A1 | 11/2002 | Schwitte et al. | |
| 2003/0037504 A1 | 2/2003 | Schwitte et al. | |
| 2005/0064182 A1 * | 3/2005 | Lunsford | C09J 7/26 428/354 |
| 2005/0136234 A1 | 6/2005 | Hak et al. | |
| 2005/0281997 A1 * | 12/2005 | Grah | B32B 37/10 428/537.1 |
| 2006/0070325 A1 | 4/2006 | Magnusson | |
| 2006/0216471 A1 | 9/2006 | Grah et al. | |
| 2011/0289854 A1 | 12/2011 | Moren et al. | |
| 2014/0000197 A1 | 1/2014 | Pervan | |
| 2015/0225964 A1 | 8/2015 | Chen et al. | |
| 2016/0016391 A1 | 1/2016 | Lundblad et al. | |
| 2017/0120564 A1 | 5/2017 | Schulte | |
| 2018/0363304 A1 * | 12/2018 | Hannig | E04F 15/107 |
| 2019/0017278 A1 * | 1/2019 | De Rick | E04F 15/105 |
| 2020/0079059 A1 | 3/2020 | Schulte | |
| 2020/0215799 A1 | 7/2020 | Hedlund et al. | |
| 2020/0284050 A1 * | 9/2020 | Troendle | B32B 27/32 |
| 2020/0325689 A1 * | 10/2020 | Li | B32B 3/30 |
| 2020/0385998 A1 * | 12/2020 | Courey | E04F 15/02038 |
| 2021/0046742 A1 | 2/2021 | Rosbrook et al. | |
| 2021/0102385 A1 | 4/2021 | Gingras | |
| 2021/0348397 A1 * | 11/2021 | Caselli | E04F 15/02038 |
| 2022/0213693 A1 * | 7/2022 | Courey | B32B 27/32 |
| 2022/0259869 A1 * | 8/2022 | Boucké | B29C 48/0023 |

FOREIGN PATENT DOCUMENTS

| | | |
|---|---|---|
| EP | 1851020 A1 | 11/2007 |
| EP | 2013034 A2 | 1/2009 |
| EP | 2805778 A1 | 11/2014 |
| WO | 9713626 A1 | 4/1997 |
| WO | 9747834 A1 | 12/1997 |
| WO | 9858769 A1 | 12/1998 |
| WO | 0151732 A1 | 7/2001 |
| WO | 0175247 A1 | 10/2001 |
| WO | 2010122514 A2 | 10/2010 |
| WO | 2014120079 A1 | 8/2014 |
| WO | 2015078434 A1 | 6/2015 |
| WO | 2015105456 A1 | 7/2015 |
| WO | 2017001976 A1 | 1/2017 |
| WO | 2017009744 A1 | 1/2017 |
| WO | 2017188883 A1 | 11/2017 |

OTHER PUBLICATIONS

Search Report from corresponding BE Application No. 201805009, dated Sep. 3, 2018.

Search Report from corresponding BE Application No. 201805751, dated Dec. 12, 2018.

* cited by examiner

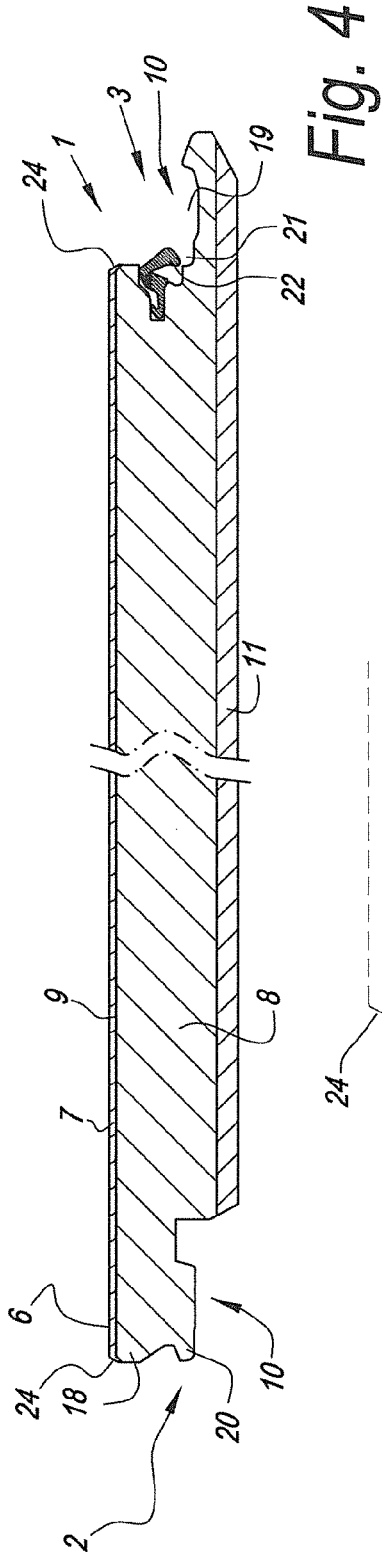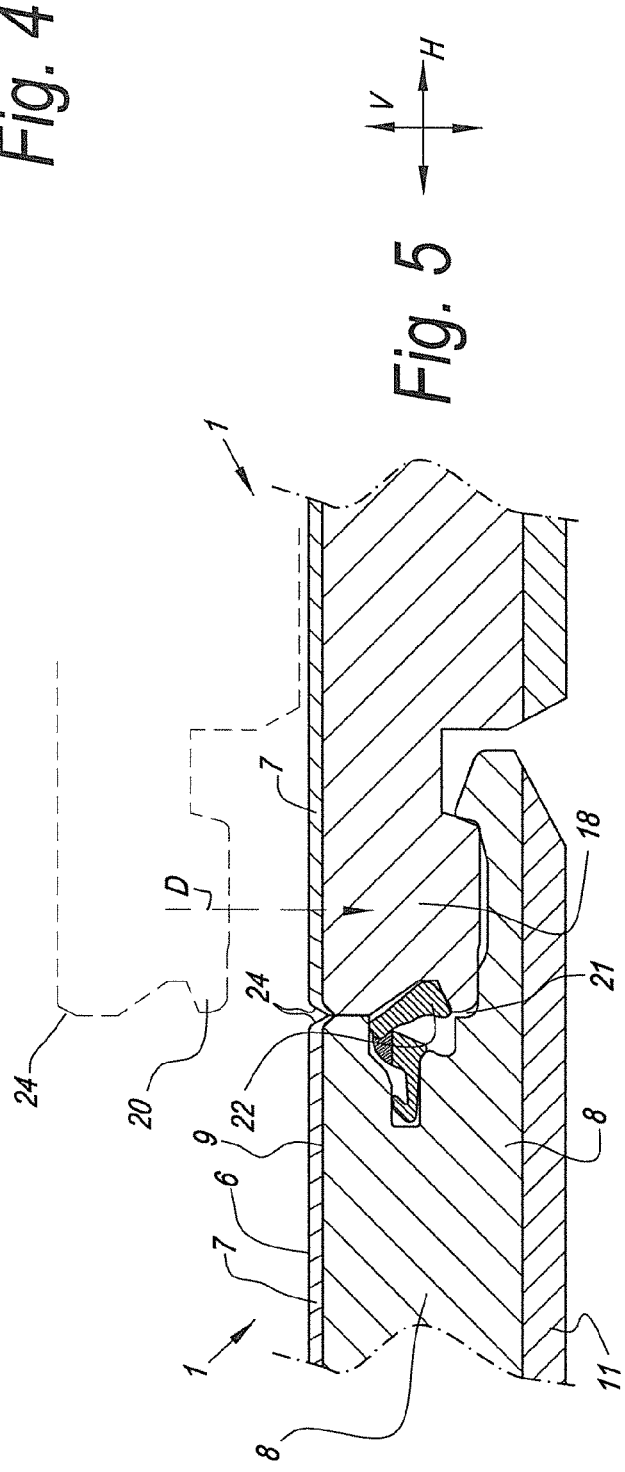

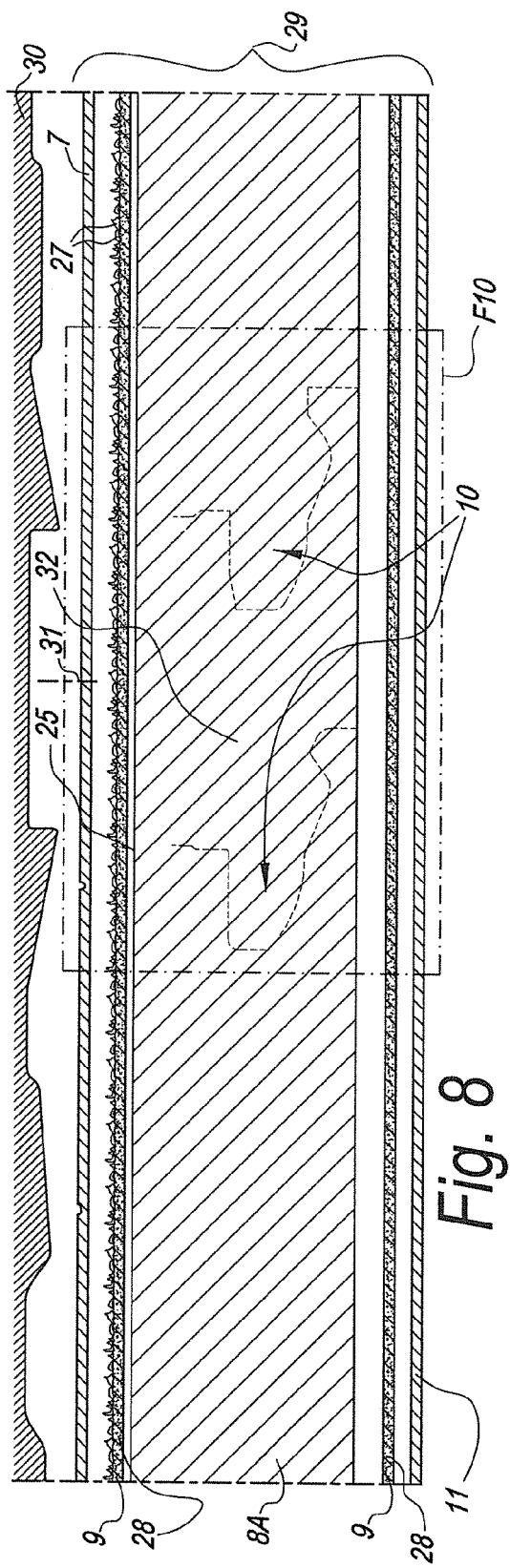
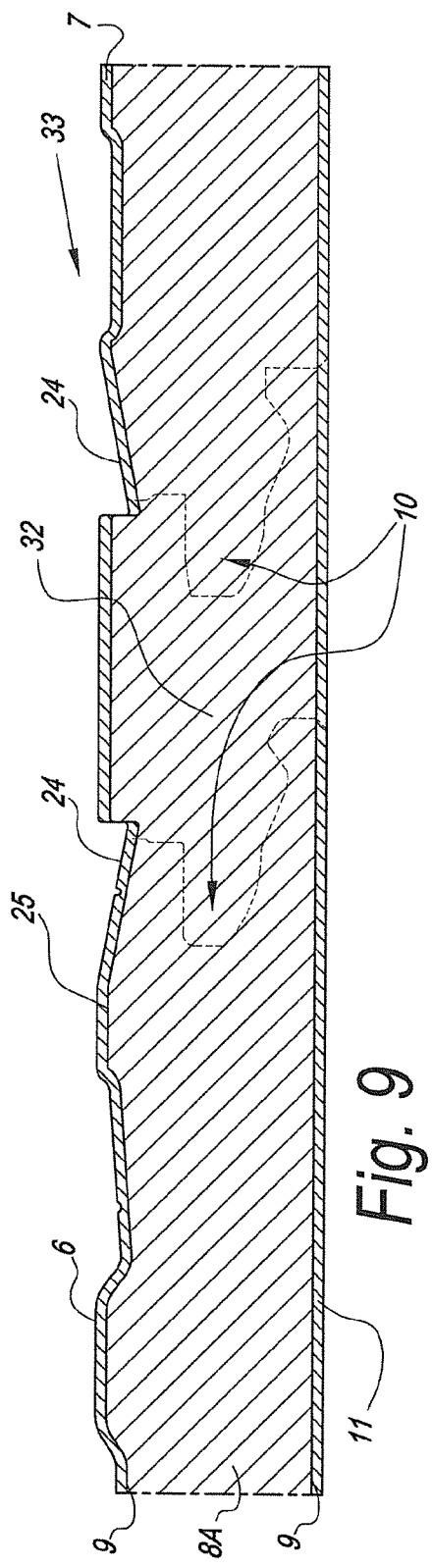

FLOOR PANEL AND METHODS FOR MANUFACTURING FLOOR PANELS

BACKGROUND

This invention relates to a floor panel, as well as to a method for manufacturing floor panels.

More particularly, the invention relates to decorative panels, such as floor panels, which comprise a top layer or decorative layer on the basis of wood. Such panels are widely known as such, for example, from WO 2010/122514. In the case of floor panels, we are talking about ready-to-lay, prefabricated or composed parquet, in English also indicated as "Engineered Wood Parquet", or about veneer parquet. The present invention is directed in particular to floor panels for veneer parquet, namely, to floor panels with a wooden top layer with a thickness of 1 millimeter or less.

Floor panels for veneer parquet are described, for example, in U.S. Pat. No. 5,755,068 and usually comprise at least a substrate and a glued thereon wood veneer of less than 2 millimeters. According to the EN 13489 standard, panels with a wooden top layer of 2.5 millimeters and more can be called multi-layered parquet or "multilayer parquet" and are not considered veneer parquet. With panels for veneer parquet, a wood-based backing layer can be glued to the underside of the substrate as well. The wood layer situated at the upper side functions as a top and decorative layer and mostly is realized from hardwood. It may in fact be treated further at its upper side, for example, in order to exert an influence on the appearance thereof and/or in order to improve the surface quality thereof, for example, via coloring, applying a wear-resistant and/or waterproof lacquer, and so on. The wood-based backing layer mostly consists of a unitary thin layer of a cheap and mostly soft wood species. Such veneer parquetry panels are sensitive to impressions by impact and can be scratch-sensitive. Due to their insufficient mechanical features, soft wood species are unusable as top layer for such panels. At the end-side edges of the veneer, there is a risk of penetration of moisture, and circular spots may show on the veneer surface.

From DE 102 45 914, it is known, for the top layer of veneer parquet, to glue a wood veneer impregnated with thermosetting resin on an MDF or HDF substrate, printing it and finishing it with a wear-resistant lacquer. For the resin, use is made of phenolic resin or melamine resin. US 2006/070,325 and US 2005/136,234 describe a method wherein a wooden top layer of 2 millimeters or more is glued under pressure on an MDF/HDF substrate, wherein a certain impregnation of the applied glue in the wooden top layer is obtained. DE 20 2013 012 020 U1 and WO 2015/078434 describe a method wherein a wooden veneer layer with a thickness between 0.6 mm and 1.2 mm is pressed, via an intermediate resin layer, on an MDF/HDF substrate in a hot press. The intermediate resin layer can comprise a thermosetting resin. The panels known from the aforementioned documents still show a limited wear resistance.

From WO 2017/009744 and WO 2017/001976, it is known that veneers of soft wood species can be compressed such that they become suitable as a decorative top layer for a veneer parquet. From WO 2017/001976, WO 2015/105456 and WO 2017/188883 it is further known to apply aluminum oxide particles in order to increase the wear resistance of the panels. According to W'456 and WO'883, a permeation of a colored mixture of glue and hard particles towards the surface of the veneer is intended, namely through pores, cracks and knots, by which pores and defects are filled up or repaired. In that the glue mixture colors the surface at least at the location of the pores and defects, the techniques of W'456 and WO'883 are suited primarily for manufacturing rather rustic veneer parquets.

SUMMARY

The present invention primarily aims at an alternative panel for veneer parquet, wherein according to various preferred embodiments solutions are offered for the problems with the floor panels of the state of the art.

To this aim, the present invention relates to a floor panel, or other decorative panel, with a substrate and a provided thereon decorative layer of wood veneer with a thickness preferably of 1 millimeter or less, wherein said decorative layer is provided on the substrate by means of a glue layer situated between the substrate and the decorative layer, characterized in that said glue layer comprises hard particles with an average particle size which is at least one third of the thickness of the wood veneer, and still better with an average particle size which is at least one half or two thirds of the thickness of wood veneer. It is clear that the thickness of the wood veneer herein relates to the thickness in the floor panel itself and not the thickness of the wood veneer before it is provided on the floor panel. As known from the state of the art, for example, from WO 2017/009744 and WO 2017/001976, namely a considerable compression of the wood veneer may be created when gluing or pressing it onto the substrate. The large hard particles which are applied within the scope of the present invention can limit the known compression of the wood veneer. This is advantageous from an economic point of view, as the client expects a certain thickness of the veneer.

To the person skilled in the art of the technical field, it is clear that the average particle size is determined via the technique of sieve analysis. Said sieve analysis uses a stack of sieves, wherein these sieves comprise raster openings of different size. Of course, the raster openings have to be chosen in accordance with the precision which is desired, and in function of the estimated particle size. Preferably, the stack can be composed by diminishing the size of the openings of the raster of the sieves from top to bottom. The sieve analysis is performed on dry particles. The sieve analysis can be performed either manually or by machine. At the end of the sieve analysis, from an initial sample, on each sieve a fraction of particles remains, with a size that is larger than the raster opening of the respective sieve and smaller than the raster opening of the preceding sieve. The weight of the remaining particle fraction is measured per sieve. The result of said sieve analysis thus is a weight distribution, wherein for each sieve, namely for the range of particle sizes corresponding to the raster openings between two adjacent sieves, the absolute weight in particles is registered.

The average particle size is calculated as the volumetric average particle size by recalculating the absolute weight of each range of particle sizes, as obtained from the aforementioned sieve analysis, to an absolute volume of each particle size on the basis of the density of the particles. From the absolute volume of a range of particle sizes, on the basis of the volume of one particle with the respective particle size (the average between the lower limit and the upper limit of the respective range) the number of particles with the respective particle size is calculated. On the basis of the calculated number of particles and the absolute volume for each particle size, the average particle volume of the respective sample is calculated. From the respective average particle volume, with the fictitious assumption that the particles are spherical, the volumetric average particle size is calculated.

The present inventors have found that, contrary to the state of the art in which the particle size of the hard particles is chosen small in view of permeation through the opening in the veneer, in fact with larger hard particles important advantages can be obtained. As the particles show an average particle size which is at least one third of the thickness of the wood veneer, it is guaranteed that these particles can penetrate to a not negligible extent into the underside of the veneer, by which a reliable barrier against excessive wear can be created. So, for example, the hard particles, or at least the most important fraction thereof, for example, more than 30% by weight or more than 50% by weight of the present particles, can penetrate into the veneer from the underside over a distance of at least 20% of the thickness thereof.

Preferably, the hard particles, or anyhow at least 30% by weight of the hard particles which are present, penetrate from the underside into the veneer. Preferably, these particles penetrate into the veneer from on the underside over a distance of at least 50% of the thickness thereof, or even of at least 75% of the thickness thereof.

Preferably, at least 40 particles per square centimeter, and still better at least 100 particles per square centimeter, penetrate into the veneer over a distance of at least 20% of the thickness thereof, and still better of at least 50% of the thickness thereof.

Preferably, less than 1 particle per square centimeter completely penetrate through the veneer, such that always an undisturbed or hardly disturbed veneer layer is maintained, wherein knots, cracks and other defects in the veneer are not taken into consideration.

Preferably, the floor panel of the invention comprises more than 30 grams per square meter of hard particles underneath the veneer, which then, in accordance with the invention, show an average particle size of more than a third of the thickness of the veneer. Preferably, the content of hard particles underneath the veneer is between 35 and 70 grams per square meter, wherein 40 to 50 grams per square meter is the most interesting from several points of view.

Preferably, the present glue of the glue layer also penetrates into the veneer from the underside, however, preferably nowhere further than over a distance which is smaller than 50% of the thickness thereof, and still better smaller than 20% of the thickness thereof. In this manner, it is obtained that when, due to wear of the veneer floor, the barrier of the penetrating hard particles is reached, the glue is not visible yet. Glue often leads to a discoloration of the veneer. By the present preferred embodiment, it is avoided that thus discoloration would be visible at an early stage. A discoloration which is visible too early would lead to a premature wear unacceptable to the user.

Preferably, the aforementioned substrate, at the surface where the decorative layer is situated, has a density of more than 900 kilograms per cubic meter. In this manner, it is obtained that the hard particles preferentially penetrate into the veneer and not into the substrate.

Preferably, the aforementioned substrate is a wood fiberboard, more particularly of the type MDF (Medium Density Fiberboard) or HDF (High Density Fiberboard). However, it is not excluded that other board materials are employed for the substrate. Preferably, these board materials show a high density at least at their surface. So, for example, a mineral-bonded board can be chosen for, such as a cement fiberboard, a magnesite board or the like.

Preferably, the aforementioned glue layer is layer on the basis of thermosetting resin, preferably melamine-based resin. With such resin, a very reliable connection between the substrate and the wood veneer can be obtained, wherein the hard particles are well embedded. Preferably, the resin is hardened by means of a press treatment, for example, with a pressure of 10 bar or more, or even of 20 bar or more, such that by means of this press treatment the penetration of the hard particles into the underside of the veneer can be obtained as well. As already mentioned, the aforementioned wood veneer preferably is at least partially impregnated by means of the aforementioned thermosetting resin. The wood veneer shows such impregnation preferably from the underside up to a certain depth in the wood veneer, wherein this depth is smaller than 50% of the thickness of the wood veneer and preferably is smaller than the average penetration depth of the hard particles.

A choice of a glue layer of melamine-based resin is advantageous in view of limiting the risk of coloring the veneer. Other thermosetting resins, such as ureum formaldehyde-based resins, lignosulfonate-based resins or furane-based resins have a brownish color, which can darken the natural color of the veneer, although this is not excluded in the scope of the invention. Certainly when the impregnation of the glue on the underside of the veneer is limited, it may be economically advantageous to still employ these light-colored resins.

According to variants, it is not excluded that the glue layer comprises a glue on the basis of polyurethane, hot-melt adhesive ("hotmelt") or polyvinyl acetate ("PVAc").

Preferably, the aforementioned glue layer, preferably a glue layer on the basis of thermosetting resin, extends uninterruptedly underneath the entire wood veneer. According to this embodiment, it is avoided that due to expansion of the wood veneer bubbles are created in the surface of the floor panel, and is obtained that the aforementioned hard particles everywhere are bonded at least to a certain extent in the glue layer.

Preferably, the aforementioned wood veneer at the upper side of the floor panel has a thickness between 0.3 and 1 millimeter, preferably approximately 0.6 millimeters. In accordance with the invention, the applied hard particles then have an average particle size of 100 microns or more, and preferably smaller than 1000 microns, or still better between 300 and 1000 microns, but preferably not larger than the thickness of the veneer. To the person skilled in the art, it is clear that the average particle size is measured by means of sieve analysis.

The material of the aforementioned hard particles preferably has a hardness of 7 or more on the Mohs scale and/or is preferably chosen from the list of aluminum oxide, titanium carbide, silicon carbide and silicon oxide. In the most preferred embodiment, hard particles of aluminum oxide or so-called corundum are applied.

Preferably, hard particles of the angular type (angular format) are employed.

According to a particular embodiment, the aforementioned hard particles assume an orientation wherein their largest main axis of inertia or main axis, seen on average, is oriented substantially perpendicular to the surface of the panel. In this manner, it is maximally guaranteed that the hard particles penetrate at the underside of the veneer up to a distance which is as large as possible. For orienting the hard particles in a method for manufacturing panels, such as the panels of the first aspect, further also possible techniques are described.

Preferably, said decorative layer comprises transparent or translucent surface material at the surface. According to a particular possibility, the transparent or translucent surface material is obtained at least on the basis of a polyurethane-based and/or acrylate-based lacquer, for example, a lacquer with at least 25 percent by weight, or still better at least 50 percent by weight of acrylates chosen from the list consisting of polyurethane acrylates, polyester acrylates and/or epoxide acrylates. Preferably, it relates to a lacquer which is cured with UV radiation, electron beam or excimer radiation. This may relate, for example, to surface material which is provided by means of an inert coating-system. Such systems are known, for example, from EP 2 805 778. Herein, a lacquer is cured by means of radiation, for example, UV radiation, through a transparent press element, for example, through a transparent press belt or press foil. Preferably, with the surface material a matte surface is obtained, namely a surface with a gloss degree of 10 or less, as measured according to DIN 67530. The gloss degree of the surface can be obtained, for example, by means of an excimer-cured lacquer layer. With excimer-cured lacquer layers, the gloss degree even can be adjusted by means of setting the energy impinging on the surface material to be cured. According to a variant, the gloss degree of the surface can also be obtained by means of an inert coating-system, wherein the structure of the applied press element, preferably a press foil, determines the gloss degree. Of course, it is also possible to obtain a glossy surface with the surface material, for example, a surface with a gloss degree of 20 or more, as measured according to DIN 67530. Preferably, the transparent surface material contains 15 to 30 percent by weight of hard particles, such as particles of corundum (Aluminum oxide) and/or silica (Silicon oxide). Herein, this may relate to particles with an average particle size of 50 micrometers or smaller, or even of 10 micrometers or smaller, wherein it is not excluded that particles might be used having an average particle size situated between 100 nanometers and 1 micrometer. To the person skilled in the art, it is clear that the average particle size is measured by means of sieve analysis. Such particles can increase the scratch resistance of the surface. The thickness of the surface material preferably is 0.05 millimeters or less. Preferably, the surface material follows a possible relief present at the surface of the wood veneer, for example, at least possibly present lower edges and preferably also at least a portion of the wood pore structure of the veneer. Preferably, the surface material extends layer-shaped over at least 80 percent of the surface of the veneer layer, and still better over the entire or almost the entire surface thereof.

According to a variant, the veneer surface can be finished by means of an oil which then penetrates into the veneer to a certain extent.

The invention preferably is applied with floor panels which can be applied for composing a floating floor covering. Preferably, the floor panels to this aim, on at least two opposite edges, are provided with coupling means allowing that two of such floor panels can be coupled to each other in a vertical direction perpendicular to the plane of the coupled panels and in a horizontal direction in this plane and perpendicular to the respective edge. Such coupling means are known as such, for example, from WO 97/47834. According to an important first possibility hereof, the coupling means at two opposite edges preferably are realized substantially as a tongue and a groove with locking parts which prevent the moving apart of the tongue and groove. Such locking parts can consist, for example, of an upwardly projecting locking element at the lower groove lip, wherein this locking element borders a recess in the lower groove lip, and a protrusion, cooperating with this locking part, at the underside of the tongue, wherein this protrusion fits in the aforementioned recess. According to an important second possibility thereof, the coupling means at two opposite edges are realized as a male part and a female part, wherein the male part can be provided in the female part by means of a downward movement, wherein the male part and the female part hook into each other, such that a locking in the horizontal direction is obtained. Preferably, the male and female part further also comprise blocking means, whether or not made in one piece, which can come into a position wherein a removal of the male part in vertical direction out of the female part is prevented. Such coupling means are known as such, for example, from WO 01/75247 or WO 01/51732.

With the same aim as in the first independent aspect, the present invention, according to its second independent aspect, also relates to a method for manufacturing floor panels or other decorative panels, wherein these floor panels comprise at least a substrate and a provided thereon decorative layer of wood veneer, wherein the method comprises at least the following steps:

the step of providing a basic board;
the step of composing a stack which comprises at least the basic board, a glue layer, hard particles and one or more wood veneers;
the step of pressing said stack, wherein the aforementioned veneers are adhered to the basic board;

characterized in that the aforementioned hard particles have an average particle size which is at least one third of the thickness of the wood veneer. By the thickness of the wood veneer in the scope of the second aspect also the pressed thickness is meant. Preferably, the pressed thickness of the veneer is smaller than 1 millimeter. However, it is clear that, when the average particle size of the hard particles is larger than one third of the thickness of the not yet pressed veneer, they then also are larger than one third of the thickness of the pressed veneer, considering that a compression of the wood veneer can only be expected by means of the press treatment. To the person skilled in the art, it is clear that the average particle size is measured by means of sieve analysis.

By means of the pressing, the hard particles can penetrate into the veneer from the underside. As already mentioned within the scope of the first aspect, such effect is maximally obtained when the basic board has a high density at the surface, such as a density of 900 kilograms per cubic meter or more.

There, where according to the second independent aspect a plurality of veneers are included in the stack, this preferably relates to veneers which are situated next to each other and not one above the other.

It is clear that the method of the second aspect primarily is intended for manufacturing the floor panels of the first aspect and/or the preferred embodiments thereof. Preferably, for the glue layer a thermosetting resin is provided and the press treatment relates to a heated press treatment. Preferably, in the method of the invention also one or more of the following measures are taken:

a thermosetting resin, for example, a melamine-based resin, can be used, which hardens at a press temperature of less than 150° C. or even of less than 120° C. In this manner, the risk of discoloration of the wood veneer by the thermal influence of the press is limited. Such hardening temperature can be obtained by adding sufficient hardener, such as by adding PTSA (p-toluene sulfonic acid) or other acidic hardeners to the melamine-based resin;

the pressing time can be shorted by hardening the present thermosetting resin on the board to a B-stage before providing the veneer in the stack. This measure also leads to a limitation of the amount of moisture which can have an influence on the press treatment and/or the wood veneer during the press treatment.

the basic board can be pre-heated, by which a shortening of the pressing time can be obtained as well, and thus a limitation of the exposure of the veneer to the press temperature;

in the stack, between the present thermosetting resin and the veneer, a moisture-absorbing layer can be provided, for example, a layer which at least comprises silica particles. This may relate, for example, to a mixture of a binder, such as PVA (Polyvinyl alcohol) and silica. Such layer can take up the moisture still present in the resin as well as the moisture created by the hardening reaction of the resin. In this manner, bubble formation is avoided and the influence of water and steam on the wood veneer during the press treatment is minimized, a thermosetting resin with a residual moisture content of less than 10 percent, for example, of approximately 7 percent, can be applied. A low residual moisture content is advantageous during pressing and reduces the risk of the occurrence of defects in the decorative top layer. An excessive amount of water namely may lead to that the veneer layers are affected and/or that the decorative layer may burst open due to a too high vapor pressure in the intermediate resin layer.

According to a particular embodiment, the aforementioned hard particles are oriented, wherein their largest main axis of inertia or main axis preferably, seen on average, substantially is oriented perpendicular to the surface of the panel. In this manner, the sharpest edges of the particles are oriented transverse to the surface of the panel and may remain active over the largest possible wear depth. Preferably, during orienting the hard particles are applied against a carrier. Such carrier preferably comprises at least the aforementioned basic board and/or the aforementioned glue layer and/or the aforementioned veneer. In the case of the veneer, the hard particles are provided on the final underside, in the case of the basic board on the final upper side, in the case of the glue layer, it is possible to provide them at the underside as well at the upper side, however, preferably at the upper side of the glue layer. The orientation of the hard particles can be realized in different manners, of which herein below two important possibilities are explained.

According to a first possibility, said hard particles are oriented by means of an electric field. According to a preferred embodiment, an electric field can be applied between the hard particles, or a bed with hard particles, and the basic board already provided with not hardened glue, which preferably is situated above the hard particles. In their electrostatically driven flight, the particles automatically orient themselves with their main axis parallel to the field lines of the applied electric field. Thus, on the basic board the provided particles show a preferential orientation with their main axis perpendicular to the basic board. By means of the glue layer, they can be fixed in this orientation at least to a certain extent. Such basic board provided with hard particles can be provided in the stack. According to a variant of the present first possibility, the hard particles can also be electrically drawn against a material sheet provided with glue, such as a paper sheet, a woven or nonwoven textile sheet. Such material sheet provided with oriented particles then is included in the stack between the basic board and the veneer.

Methods in accordance with the above first possibility are known as such from other technical fields, such as from the technology of manufacturing sandpaper. So, for example, the technique of the variant of the preferred embodiment of the first possibility is known as such from U.S. Pat. No. 2,457,256 or US 2011/289,854. Also other methods from the technical field of the manufacture of sandpaper can be applied within the scope of the present invention. So, for example, may the technology described in U.S. Pat. No. 1,854,071 be applied within the scope of the present invention. Herein, the hard particles then first are provided in random orientation, more particularly strewn, on a glue-provided carrier, after which they are oriented in the still wet glue by means of electrodes.

According to a second possibility, the aforementioned hard particles are oriented by means of a sieve treatment. To this aim, preferably use is made of rather oblong particles with a considerably smaller size perpendicular to the main axis of the particles. When such particles are put through a sieve with openings having a size smaller than the main axis, however, larger than the transverse diameter of the particles, the particles exit the sieve preferentially with their main axis perpendicular to the sieve surface. The sieved particles can be fixated in this orientation on a basic board or material sheet provided with not yet hardened glue. Such basic board and/or material sheet then may be included into the stack in the same manner as described in the scope of the above first possibility.

The glue layers mentioned within the scope of the first and the second possibility preferably relate to at least a portion of the final glue layer of the obtained floor panel. Preferably, this relates to a glue layer comprising a thermosetting resin or consisting of a thermosetting resin, such as, for example, of melamine-based resin.

Preferably, the aforementioned hard particles have a dielectric constant, or relative electric permittivity, of more than 5. With such hard particles, the above first possibility can be applied in a smooth manner.

According to a particular embodiment of the present invention, the hard particles may form part of a commercially available sandpaper with hard particles, which show the particle size required according to the invention. In such case, in the stack a glue layer is provided preferably above and underneath the sandpaper.

The method of the second aspect, and the floor panels of the first aspect in general, may show the advantage that they can only be applied optimally with high-quality veneers, namely with veneers with hardly show any knots, cracks or other defects. These defects still can be separately repaired with filler, such as wood paste, by means of the known, primarily manual, techniques. With the aim of repairing defects in veneers in a more industrial manner, the invention according to its third aspect also relates to a method for manufacturing floor panels, wherein these floor panels comprise at least a substrate and a provided thereon decorative layer of wood veneer, wherein the method comprises at least the following steps:

the step of providing a filler, such as colored paste or liquid, at least on the rear side of one or more wood veneers;

the step of providing a basic board;

the step of composing a stack which comprises at least the basic board, a glue layer, preferably hard particles, and the aforementioned one or more wood veneers;

the step of pressing said stack, wherein the aforementioned veneers are adhered to the basic board.

The inventors have found that the filling or repairing of cracks and knots can take place in a simple manner by providing fillers on the rear side of the veneer, namely, before this veneer is adhered to the basic board. Possible excess filler, which remains present on the rear side of the veneer, has no or hardly any influence on the further course of the method, such as on pressing and the like, and remains invisible on the surface of the final panel. It is clear that the filler of the third aspect preferably comprises pigments or other colorants. It also may contain, for example, wood dust.

Preferably, the filler which is applied contains a similar glue as the aforementioned glue layer, such that during pressing a good bond can be formed between the fillings and the substrate. Preferably, the glue as well as the filler contain melamine-based resin.

There, where according to the third independent aspect a plurality of veneers are included in the stack, this preferably relates to veneers which are situated next to each other and not one above the other.

It is clear that the method of the third aspect preferably is applied for manufacturing the floor panels of the first aspect. In such case, the hard particles can also penetrate from the underside into the fillings of the defects, such that on those locations, too, a barrier against excessive wear is obtained. Further, it is clear that the method of the third aspect can be combined with the method of the second aspect, wherein then in the second aspect a repaired veneer is included in the stack, wherein this veneer is provided with filler from the underside.

Further, it is also noted that, according to preferred embodiments of all aspects, a floor panel with a substrate and a provided thereon decorative layer of wood veneer with a thickness of 2 millimeters or less, or still better of 1 millimeter or less, wherein the aforementioned substrate has an average density of more than 750 kilograms per cubic meter, and that the aforementioned decorative layer is provided on the substrate by means of a layer on the basis of thermosetting resin situated between the substrate and the decorative layer. The combination of a high average density of the substrate and a gluing of the wood veneer on the basis of a thermosetting resin leads to a veneer parquet with high impact resistance. The underlying substrate with high density functions unimpaired as a buffer for impression deformations or perforations exerted on the thin veneer, as the intermediate resin layer forms a relatively hard connection between the veneer and the substrate.

As aforementioned, the substrate in all aspects preferably, at least at the surface where the decorative layer is situated, shows a density of more than 900 kilograms per cubic meter, or even of more than 1000 or 1100 kilograms per cubic meter. Preferably, herein this relates to a density increased locally at the surface, whereas the core of the substrate shows a density which is lower than average, for example, less than 800 or less than 750 kilograms per cubic meter. The combination of a high surface density with a lower internal density leads to an optimum between impact resistance and sound absorption in the use of a veneer parquet composed of the panels of the invention. Preferably, the aforementioned substrate is a wood fiberboard, more particularly of the type HDF. Herein, this may relate to a HDF board which is glued by means of ureum formaldehyde, melamine formaldehyde or melamine-ureum formaldehyde. According to another possibility, this HDF board is glued by means of pMDI. pMDI or polymeric methylene diphenyl diisocyanate has a certain resiliency and in this manner can contribute to the impact resistance of the floor panel. Preferably, the aforementioned substrate has a swelling of less than 15% as measured according to EN 317:1993. Preferably, the aforementioned substrate has a thickness between 5 and 15 millimeters and still better between 6 and 10 millimeters.

According to a preferred embodiment of all aspects, the aforementioned floor panel is provided with lower edge regions on one or more edges, wherein the aforementioned wood veneer extends in one piece from on the surface of the substrate over the aforementioned lower edge regions. As the veneer extends up to a lower-situated region at the edge of the floor panel, an increased wear resistance is obtained at these edges. A direct impact or directly walking on the edge of the veneer then is unlikely, and delamination or other damage of these edges is as good as excluded. Moreover, such edge region renders the visual illusion that the panel has a thicker wooden top layer. Preferably, the aforementioned lower edge region forms a bevel or other chamfer, wherein the wood veneer extends over the lower edge region at least up to a point where the veneer surface is situated on a level in a horizontal plane which intersects the aforementioned substrate.

In the case of an oblong rectangular floor panel, said lower edge regions preferably are provided at least on the opposite long edges and possibly additionally on the opposite short edges, however, not necessarily. The short edges also may be free from lower edge regions.

Preferably, the aforementioned wood veneer is compressed on one or more edges. This can be obtained, for example, by forming lower edge regions at the respective edges by means of an impression of the veneer and preferably also of underlying layers, such as the substrate. When performing such impression, preferably also the aforementioned layer of thermosetting resin hardens, such that the springing back of the impressed material may remain limited. Providing compressed wood veneer on the edges leads to an increased resistance against moisture penetration. It is in particular advantageous when at least the edges of the end faces of the wood veneer are compressed.

Preferably, the layer on the basis of thermosetting resin mentioned in the aspects extends uninterruptedly underneath the entire wood veneer. In the case that the wood veneer extends on lower edge regions of the veneer, the thermosetting resin preferably also extends on these lower edge regions, such that a good adherence of the veneer is obtained and a possible springing back of compressed material is limited.

Preferably, on the underside of the substrate a backing layer is provided, which also contains thermosetting resin, for example, a backing layer on the basis of a paper sheet impregnated with resin, or a backing layer on the basis of a wood veneer layer which is attached to the substrate with a thermosetting resin layer. This may relate, for example, to a veneer of spruce or pine. A backing layer of wood veneer preferably has a thickness of minimum 1 to 2 millimeters, for example, approximately 1.5 millimeters. Herein, this may relate to a veneer which is obtained by means of a rotative cutting treatment, or so-called "rotary peeled veneer".

For obtaining an optimum water resistance, the substrate and/or the wood veneer preferably is treated with a fluoro copolymer or a pMDI on one or more edges. This treatment preferably relates to a treatment of the end-side edges of the wood veneer and/or at least the substrate material immediately underneath the wood veneer. Such treatment can also be performed partially overlapping with the surface of the wood veneer. This is particularly interesting in the cases where the wood veneer extends at the respective edge over a lower-situated edge region. In those cases any disturbing effect of the overlap with the surface of the floor panel is less prominent, as it can be limited to a portion of the surface which is situated in this lower-situated edge region. Preferably, the overlap is limited to the portion which is situated immediately at the edge of the floor panel. So, for example, may the technique be applied which as such is known for laminate floor panels from EP 2 013 034 B1.

The glue layer mentioned in the aspects, possibly thermosetting resin layer, can be provided in the aforementioned stack in different manners. According to a first manner, the resin can be applied at least partially liquid on the basic board, for example, by means of one or more roller devices and/or spreading devices, after which it is dried to a residual moisture content of preferably less than 10 percent by weight. According to a preferred embodiment, the basic board is also applied for providing the hard particles in the stack, wherein these hard particles preferably are embedded in the dried glue or resin. As aforementioned, the particles preferably are oriented with their main axis substantially transverse to the surface of the basic board, for example, by means of the also above-mentioned first possibility thereof. According to a second manner, the resin can be provided on the basic board at least partially in powder form, for example, by means of one or more strewing devices. Preferably, this powder resin is fixed somewhat in the stack, for example, by nebulizing water thereon. The hard particles, together with the resin, may form part of a powder mixture which is applied according to this second manner, or they can be separately provided in the stack, for example, by strewing them separately on or under the resin, or by bringing them into the stack by means of a carrier sheet. According to a third manner, the resin can be provided at least partially by means of a carrier sheet, such as a paper sheet. Preferably, it is started with a paper sheet having a weight between 15 and 150 grams per square meter, preferably between 50 and 100 grams per square meter, and still better of approximately 70 grams per square meter. The paper sheet preferably is opaque, possibly provided with a print. To the person skilled in the art, it is clear that the weight of the paper also contributes to the opacity. Of course, it is not excluded that a transparent paper sheet might be used, such as an alpha-cellulose paper without fillers, for example, of the type which is applied as an overlay in laminate floors. Such a paper sheet then typically has a weight of 15 to 30 grams per square meter. Such paper sheet then, prior to the step of composing the stack, can be impregnated with resin, preferably saturated with resin, and dried to a residual moisture content of preferably less than 10 percent by weight. The impregnated and dried sheet then is included in the stack. According to the most preferred embodiment, the respective sheet is also applied for providing the hard particles in the stack, wherein these hard particles preferably are embedded in the dried glue or resin. As aforementioned, the particles preferably are oriented with their main axis substantially transverse to the surface of the carrier sheet, for example, by means of the also above-mentioned variant of the first possibility thereof. According to a fourth manner, the resin can at least partially be provided in the stack in that the wood veneer, prior to the step of composing the stack, is provided with resin at the underside. In this case, the hard particles also can be provided at the underside of the wood veneer, possibly in aligned orientation.

Of course, it is not excluded that the aforementioned manners for providing the glue layer are combined in the same stack and that, in other words, a portion of the glue is provided via a first manner, whereas another portion of the glue, or the resin, is provided via a second manner.

Preferably, in the stack, underneath the wood veneer and above the substrate, there is at least a not transparent layer, possibly not translucent layer, thus, opaque layer. Such layer prevents that the color of the substrate shows through towards the surface of the relatively thin wood veneer. Preferably, an opaque paper sheet is used. Possibly, the paper sheet can be colored, whether uniformly or not, in order to let a color determined beforehand show through towards the surface of the veneer. According to another possibility, the paper sheet can show a print, which then preferably is intended for showing through at the surface of the veneer. It is clear that the not transparent layer can also function as a carrier layer for the glue and/or the hard particles and that thus not necessarily a separate layer must be applied.

Preferably, the step of pressing, of the second and third aspect, is performed in a heated press, for example, with a temperature of more than 80° C., and/or at least the upper surface of the basic board has a temperature of more than 60° C. during the step of pressing.

The wood veneers, which are included in the second and/or the third aspect of the invention in the stack mentioned there, possibly may be adhered to each other by means of sewing and/or glue connections, such that a veneer layer is obtained, portions of which are present in a plurality of the finally obtained floor panels. Preferably, the obtained floor panels are free from such sewing and/or glue connections, or anyhow at least free from such connections which would extend transverse to the longitudinal direction of the panel. Thus, preferably it is taken care that such connections in the pressed whole are situated on substrate material which has to be removed with dividing and/or finishing. According to a variant, a plurality of separate wood veneers are included in the stack and positioned next to each other, wherein the seam between adjacent wood veneers is situated on substrate material which has to be removed.

The herein above-mentioned step of finishing may relate, for example, to providing the earlier also mentioned surface material, for example, according to the first possibility thereof, and/or to forming coupling means on one or more edges of the floor panels. Preferably, a matte surface is realized by means of the provided transparent or translucent surface material.

It is also noted that the forming of coupling means preferably is performed at least with machining tools, such as rotating milling tools. By the presence of hard particles of exceptional average particle size, a more than normal wear may occur on the tools working on the upper edge of the panels. In such case, it can be advantageous, for treating one or more of the upper edges, to rely to laser cutting or ultrasonic treatment, such as respectively described in EP 1 851 020 and WO 97/13626. According to another possibility, the hard particles can at least be omitted at the edges, or in the vicinity of the edges. In this manner, a normal wear of the tools can be expected. Omitting the hard particles can be realized in various manners. According to a first possibility, the hard particles are applied by means of carrier sheets with a surface which corresponds or approximately corresponds to the size of the final panels, such that the hard particles do not or hardly protrude beyond the edges of the finally to be obtained panels. It is evident that the hard particles on the separate carrier sheets can be oriented by means of any technique, for example, of that of the first possibility thereof. According to a second possibility, the hard particles are applied in a raster pattern on a continuous carrier sheet, wherein the raster is performed such that the edges to be treated of the final panels are free from hard particles, contain less hard particles or contain smaller hard particles. Such raster may be obtained, for example, by means of a screen-printing technique, or by means of a technique wherein the carrier sheet is provided with glue in the desired raster pattern, the hard particles are provided over the entire surface of the carrier sheet and the not adhering particles are removed again, or by means of a technique similar to that of WO 2014/120079, wherein the glue is deposited in the desired pattern in a digital manner, the hard particles are provided over the entire surface on the carrier sheet and the not adhering particles are removed again. According to a third possibility, the herein above-mentioned raster is provided on the basic board. According to a fourth possibility, the hard particles are provided on the underside of the veneer. When separate veneers with the size of the final floor panels are applied, the desired effect of the absence of hard particles beyond the edges can be obtained in a simple manner. In the case of veneers which are composed to a larger sheet by means of a glue and/or sewing connection, the above-mentioned rasters are realized on the underside of the sheet. It is evident that the techniques wherein a glue is applied in raster can be combined in a simple manner with the aforementioned first possibility for orienting the hard particles.

The most preferred embodiment of a floor panel with the characteristics of the first aspect and/or obtained according to the second aspect can be summarized as follows:

- the floor panel comprises a substrate with an average density of more than 750 kilograms per cubic meter, however, with a peak density on the upper surface of 900 kilograms per cubic meter or more. Preferably, this relates to an MDF or HDF board.
- for the decorative layer, it is started from a wood veneer of hardwood, such as oak, which prior to pressing has a thickness of 0.4 to 0.8 mm, preferably approximately 0.6 mm. After pressing, thus, in the final floor panel, the veneer of 0.6 mm is compressed to a thickness of 0.55 mm.
- for the glue layer, it is started from a paper sheet with a weight between 15 and 150 grams per square meter, preferably between 50 and 100 grams per square meter, and still better approximately 70 grams per square meter. The paper sheet preferably is opaque, possibly provided with a print. The glue layer is provided with thermosetting resin, preferably melamine-based resin, wherein the content of resin is between 50 and 150% of the weight of the paper. In case of a weight of the paper of 70 grams per square meter, for example, 80 grams per square meter of melamine-based resin can be provided. This takes place by means of known impregnation techniques, such as immersion in a resin bath, or by means of one or more rollers. On the paper provided with resin then 40 to 50 grams per square meter of hard particles are provided. In case of a weight of the paper of 70 grams per square meter with 80 grams per square meter of melamine-based resin, 50 grams per square meter of hard particles can be provided. The hard particles have an average particle size between 200 micrometers and 500 micrometers, preferably 400 to 450 micrometers. To the person skilled in the art, it is clear that the average particle size is measured by means of sieve analysis. Preferably, the hard particles are aluminum oxide or corundum particles. For example, the commercially available WSK 46 can be chosen. Preferably, the hard particles are applied on the still wet paper sheet by means of an electric field, such that they are oriented with their largest main axis of inertia substantially transverse to the paper surface.
- Preferably, thereafter the present resin is dried brought into a B-stage, i.e., a re-activatable not yet finally hardened condition and so included into the stack mentioned within the scope of the second aspect, namely between the basic board and the veneer.
- After pressing a wood veneer of 0.6 mm on the above-mentioned glue layer, which comprises corundum particles of 0.45 mm, a floor panel is obtained with a wear barrier situated at 0.15 mm below the surface of the veneer. When performing a wear test, from this depth a considerably less fast wear is observed. During the wear tests, on this limited depth no discoloration of the veneer is observed, as the melamine-based resin does not penetrate that far into the veneer.

According to a fourth, independent aspect, the invention relates to a floor panel with a substrate and a provided thereon decorative layer of wood veneer with a thickness of 1 millimeter or less, wherein said decorative layer is provided on the substrate by means of a glue layer situated between the substrate and the decorative layer, wherein said glue layer comprises hard particles, which penetrate into the aforementioned wood veneer at the underside over a distance of at least 20% of the thickness of the aforementioned wood veneer.

Preferably, the hard particles penetrate for 30% by weight or more of the aforementioned hard particles at the underside into the aforementioned wood veneer. Preferably, the hard particles penetrate for 30% by weight or more of the aforementioned hard particles at the underside into the aforementioned wood veneer over a distance of at least 20% of the thickness of the aforementioned wood veneer.

Preferably, the hard particles penetrate into the wood veneer from the underside over a distance of at least 50% of the thickness of the respective wood veneer, or even of at least 75% of the respective wood veneer. Preferably, the hard particles penetrate for 30% by weight or more of the aforementioned hard particles at the underside into the aforementioned wood veneer over a distance of at least 50% of the thickness of the respective wood veneer, or even of at least 75% of the thickness of the respective wood veneer.

Preferably, at least 40 particles per square centimeter, and still better at least 100 particles per square centimeter, penetrate into the wood veneer over a distance of at least 20% of the thickness of the respective wood veneer, and still better of at least 50% of the thickness of the respective wood veneer.

Preferably, the aforementioned hard particles assume an orientation wherein their largest main axis of inertia or main axis, seen on average, is oriented substantially perpendicular to the surface of the panel.

Preferably, the aforementioned substrate is a wood fiberboard, more particularly of the type MDF (Medium Density Fiberboard) or HDF (High Density Fiberboard). However, it is not excluded that other board materials are employed for the substrate. Preferably, these board materials have a high density at least at their surface. So, for example, a mineral-bonded board can be chosen, such as a cement fiberboard, a magnesite board, or the like.

Preferably, the aforementioned glue layer is a layer on the basis of thermosetting resin, preferably melamine-based resin, such as described in the first aspect of the invention.

Preferably, at the underside of the substrate a backing layer is provided, which also comprises thermosetting resin, for example, a backing layer on the basis of a paper sheet impregnated with resin, or a backing layer on the basis of a wood veneer layer, which is attached to the substrate by means of a thermosetting resin layer, as described in the third aspect of the invention.

It is clear that the floor panel of the present fourth aspect further can show the characteristics of the above-mentioned first aspect, and/or can be manufactured by means of a method with the characteristics of the second and/or third aspect, without thereby necessarily having to apply the mentioned average particle sizes.

BRIEF DESCRIPTION OF THE DRAWINGS

With the intention of better showing the characteristics of the invention, herein below, as an example without any limitative character, some preferred embodiments are described, with reference to the accompanying drawings, wherein:

FIG. 4, in a view similar to that of FIG. 2, represents a variant;

FIG. 5, at a larger scale, represents the floor panel of FIG. 4 in coupled condition;

FIGS. 8 and 9 illustrate a step in a method with the characteristics of the invention;

DETAILED DESCRIPTION OF VARIOUS EMBODIMENTS

Figure 1:
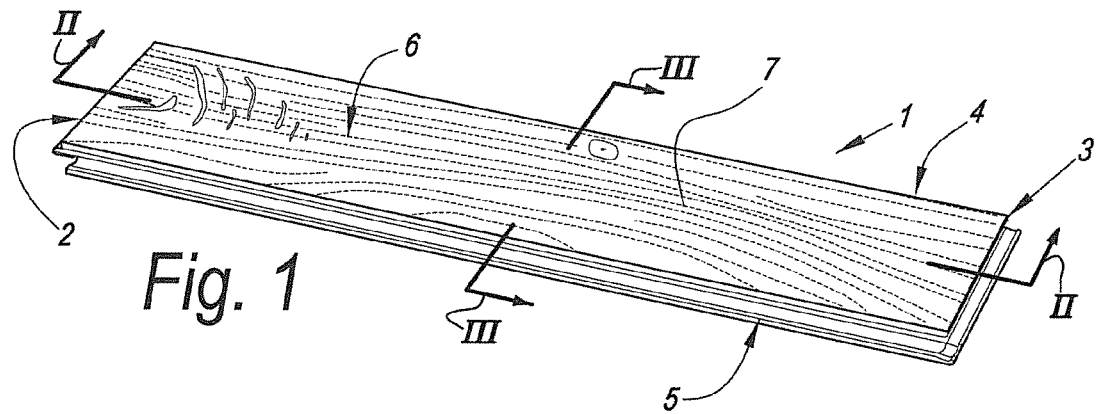
FIG. 1 in perspective represents a floor panel with the characteristics of the invention.

FIG. 1 represents a decorative panel, more particularly a floor panel 1, in accordance with the invention. The panel 1 is rectangular and oblong and comprises a pair of opposite short edges 2-3 and a pair of opposite long edges 4-5. The decorative top layer 6 is formed by a wood veneer 7 with a thickness of 1 millimeter or less, in this case the veneer has a thickness T1 of approximately 0.6 millimeters.

Figure 2:
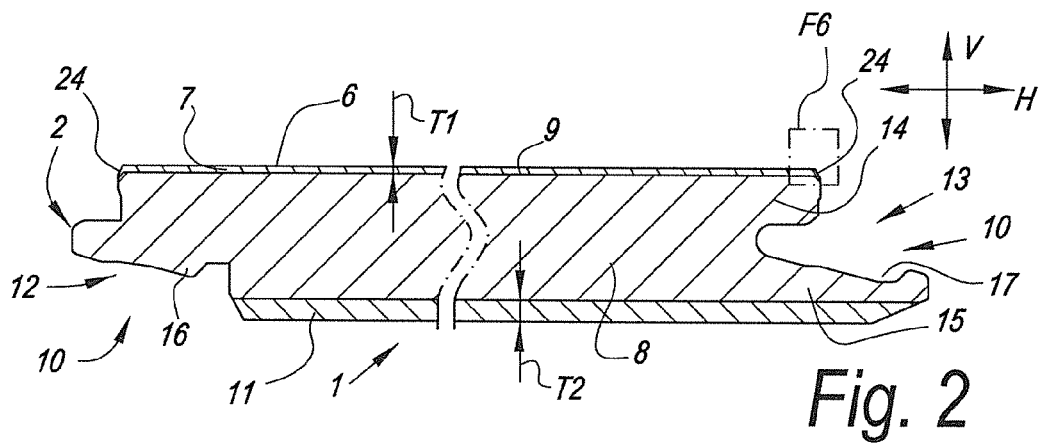
FIGS. 2 and 3, at a larger scale, represent a cross-section according to the lines II-II and respectively, represented in FIG. 1.

FIG. 2 clearly shows that the decorative panel 1 comprises a substrate material 8 on which the wood veneer 7 is provided by means of a layer on the basis of thermosetting resin 9, situated between the substrate and the decorative layer. According to the invention, the substrate 8 has an average density of more than 750 kilograms per cubic meter. In this case, this relates to an HDF board material with an average density of 900 kilograms per square meter and a surface density of more than 1000 kilograms per square meter. At the edges 2-3 and 4-5, mechanical coupling means 10 are formed in the substrate material by means of milling cutters. At the underside of the substrate material 8, a backing layer 11 is provided, for example, glued or otherwise attached to the substrate material 8. According to a preferred embodiment of the invention, such backing layer 11 is also attached to the substrate material 8 by means of a layer of thermosetting resin. Such backing layer 11 preferably is made of a wooden veneer layer with a thickness T2 of at least 50 percent of the decorative top layer. Still better, the decorative top layer of the wood veneer 7 and the backing layer 11 differ from each other at least in that the wood veneer of the backing layer 11 is thicker than the wood veneer 7 of the top layer. The backing layer 11 may consist, for example, of a "rotary peeled veneer" with a thickness T2 of 1.5 millimeters or thicker, whereas the wood veneer 7 of the top layer is a veneer with a thickness T1 of less than 1 millimeter.

Figure 3:
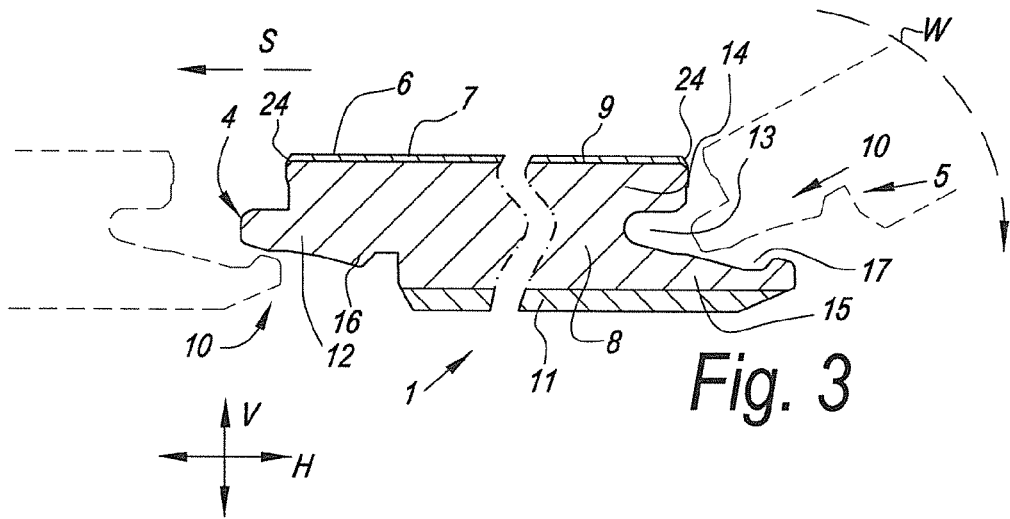

FIGS. 2 and 3 represent that both pairs of opposite edges 2-3-4-5 are provided with mechanical coupling means 10 which substantially are realized as a tongue 12 and a groove 13 bordered by an upper lip 14 and a lower lip 15, wherein the tongue 12 and the groove 12 substantially are responsible for the locking in a vertical direction V, and wherein the tongue 12 and the groove 13 are provided with additional locking parts 16-17, which substantially are responsible for the locking in a horizontal direction H. Preferably, the locking parts comprise a protrusion 16 at the underside of the tongue 12 and a recess 17 in the lower groove lip 15. The coupling means 10 represented in FIGS. 2 and 3 allow at least a coupling by means of a rotational movement W around the respective edges 2-3-4-5 and/or a coupling by means of a shifting movement S in a substantially horizontal manner of the edges 2-3-4-5 to be coupled towards each other.

FIGS. 4 and 5 represent a variant with a pair of short edges 2-3, which allow obtaining a coupling at least by means of a downward movement D. An edge 2 is provided with a male coupling part 18, whereas the other edge 3 is provided with a female coupling part 19. By means of the downward movement D the male coupling part 18 is pressed into the female coupling part 19 in order to be locked there in the vertical direction V, as a result of a pair of cooperating protrusions 20 and recesses 21. In this case, the recess 21 is partially formed by a resilient element 22 present in the female coupling part 19.

Figure 6:
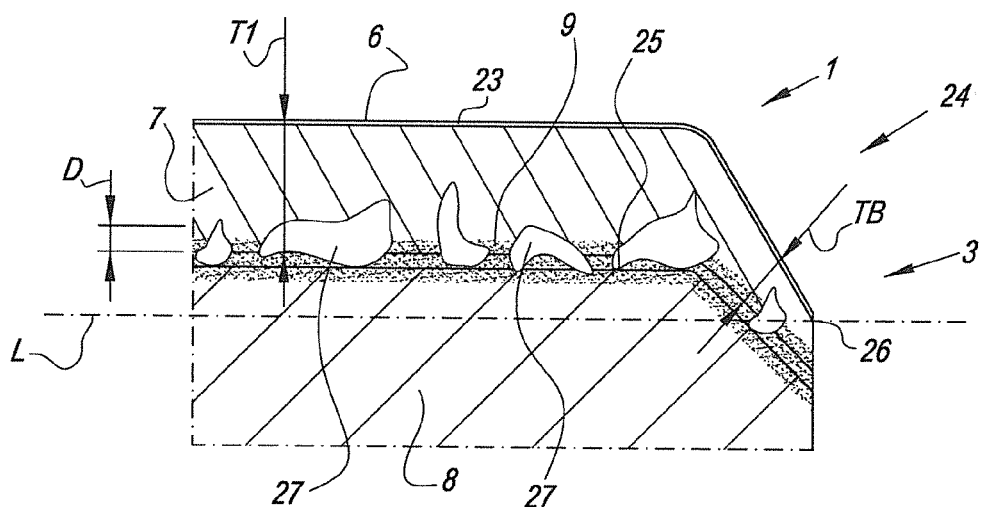
FIG. 6, at a larger scale, shows a view onto the region indicated by F6 in FIG. 2.

FIG. 6 represents a detail of the upper edge of the floor panel from FIG. 2. It is shown clearly that the layer of thermosetting resin 9 can penetrate partially into the substrate material 8 and partially into the wood veneer 7 of the top layer.

FIG. 6 further clearly shows that the decorative layer 6 at the surface comprises transparent or translucent surface material 23. In this case, this relates to a material with a matte structure, namely with a gloss degree of 10 or less, as measured according to DIN 67530.

The floor panel from the FIGS. 1 to 7 is provided with lower edge regions 24 on one or more edges 2-3-4-5, wherein the wood veneer 7 extends in one piece from on the surface 25 of the substrate 8 over these lower edge regions 24. In the example, the lower edge regions 24 are realized as bevel or chamfer. The wood veneer 7 extends over the lower edge region 24 at least up to a point 26, wherein the veneer surface is situated at a level L in a horizontal plane which intersects the aforementioned substrate 8. At the location of the lower edge regions 24, the wood veneer 7, seen on average, has a thickness TB which is smaller than the global thickness T1 of the wood veneer 7. At these edges, the wood veneer 7 is compressed or impressed. In the present case, also the substrate material 8 is impressed at the location of these edges. This compression of the wood veneer 7 leads to an increased resistance against moisture penetration. Preferably, the average thickness TB of the wood veneer on the lower edge regions is less than 85% of the global thickness T1 of the wood veneer.

In the examples, the thermosetting resin 9 extends uninterruptedly underneath the entire wood veneer 7, inclusively the lower edge regions 24.

The surface material 25 follows the relief of the wood veneer 7 at least over the lowered edges 24 or chamfers.

FIG. 6 schematically represents that the thermosetting resin 9 or the glue layer comprises wear-resistant particles 27. According to the invention, the hard particles 17 show an average particle size which is at least one third of the thickness T1 of the wood veneer 7. These particles penetrate at the underside into the wood veneer 7 and there provide for a barrier against the final wearing through of the veneer 7. Due to the choice of the average particle size, the particles 27 penetrate from on the underside into the veneer 7 over a distance which is larger than the distance D, wherein the distance D is 20% of the thickness T1 of the wood veneer 7.

It is noted that also in the surface material 25 there are wear-resistant particles, however, with a smaller average particle size, for example, of 10 micrometers or smaller.

Figure 7:
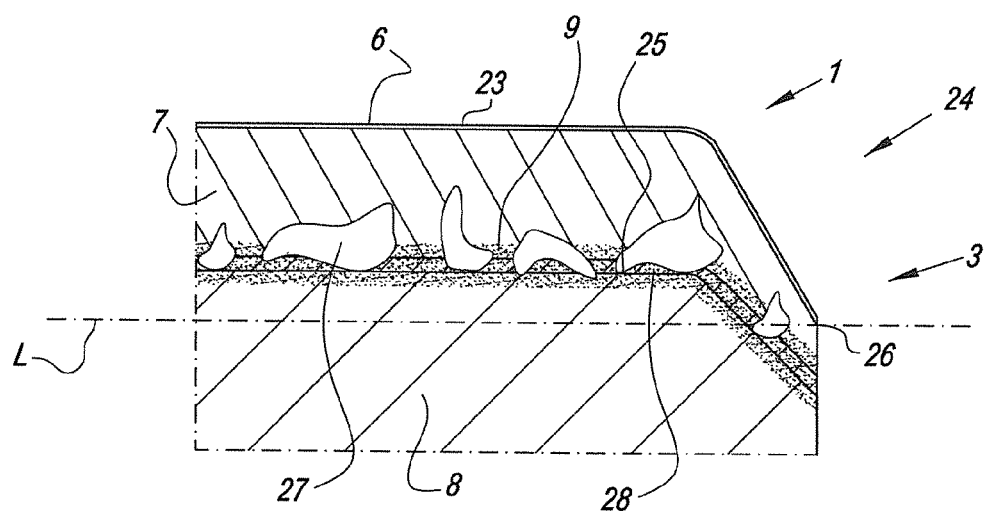
FIG. 7, in a view similar to that of FIG. 6, represents variants.

FIG. 7 represents another variant, wherein the thermosetting resin 9 encloses a material sheet, such as a paper sheet 28. Preferably, this relates to a paper sheet 27 with a surface weight between 50 and 150 grams per square meter. Preferably, the thermosetting resin 9 is applied by means of the paper sheet 28, namely in that this paper sheet is impregnated with resin 9, preferably is saturated with resin, and in this manner is placed on the substrate material 8.

FIG. 9 represents a stack 29 which is pressed by means of the method of the aspect. For the press treatment in this case a structured press element 30 is applied. The stack 28 comprises a basic board 8A with an average density of more than 750 kilograms per cubic meter, a layer of thermosetting resin 9 and a wood veneer 7 for forming the decorative top layer 6. Further, the stack 29 also comprises a wood veneer for forming the backing layer 11 and a layer of thermosetting resin 9 for attaching this backing layer 11 to the underside of the basic board 8A. In the example, the layers with thermosetting resin 9 each time are realized by means of a paper sheet 28, which is impregnated with this resin. The wood veneer 7 comprises a sewing connection 31, which is positioned above a portion 32 of the basic board 8A, which has to be removed in subsequent treatments for subdividing and forming of coupling means 10, which here already are represented in dashed line. In the example, the basic board 8A comprises a flat upper surface 25. However, it is not excluded that the upper surface may be pre-formed, entirely or partially, corresponding to the applied press element 30.

Figure 10:
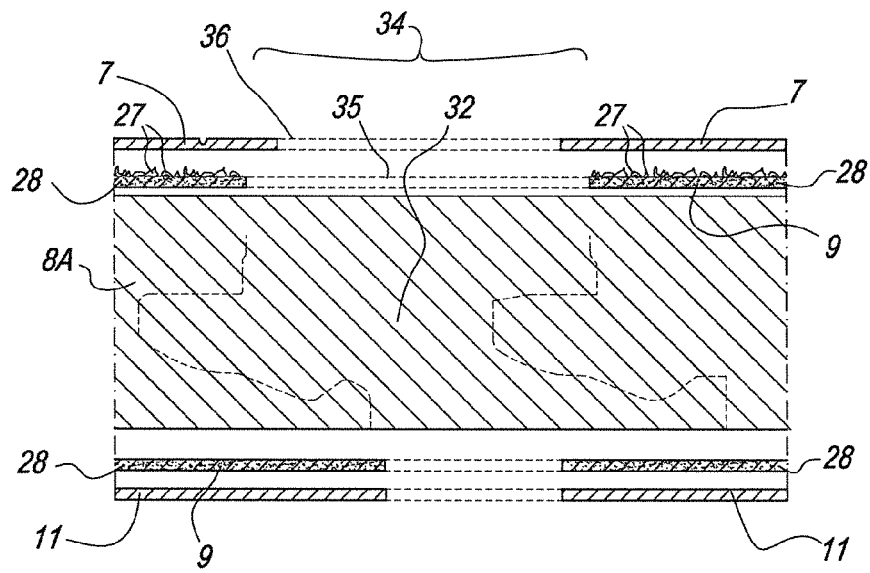
FIG. 10 represents a variant in a view onto the region indicated by F10 in FIG. 8.

FIG. 10 represents the obtained pressed whole 33. Herein, the decorative top layer 6 and the backing layer 11 is represented only schematically each time as one layer, namely without representing the layers with resin 9 and the paper sheets 28. From this, it is clear that the veneer 7 and the backing layer 11 are adhered to the basic board 8A by means of the hardened resin 9. Moreover, the basic board 8A is deformed such that the upper surface 25 shows a structure. The wood veneer 7 follows the contour of the structured upper surface 25. Hereby, in this case, it is obtained that the wood veneer 7 comprises a relief of scraped parquet with lowered edges 24.

Figure 11:
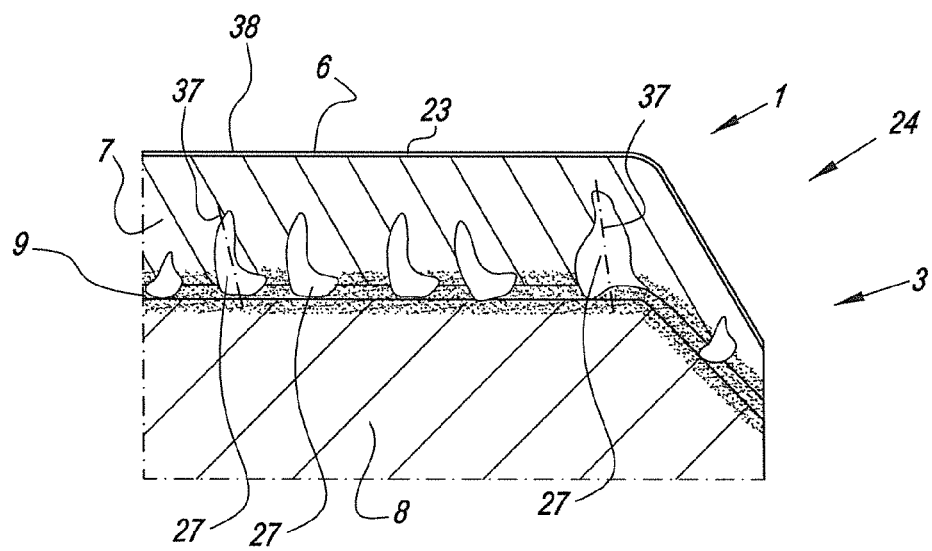
FIG. 11 represents another variant of a floor panel in a view similar to that of FIG. 7.

FIG. 11 represents that at least the hard particles 27 can remain absent at the location of the portion 32. In this manner is achieved that the cutting tools, which have to remove the portion 32 in order to form the coupling means, are less subjected to wear. In this case, an embodiment is represented wherein a plurality of paper sheets 28 filled with hard particles 27, with intermediate space 34, are provided in the stack. Herein, the space 34 between the paper sheets 28 is situated above the portion 32 and in this case extends at least over this entire portion. According to the variant represented in dashed line 35, it is also possible that the paper sheet 28 and possibly the resin 9 provided thereon extends continuously over the portion 32, however, that the hard particles 27 remain absent there or anyhow at least are present to a much more limited extent.

FIG. 11 further represents that, whether or not in combination with the above, a plurality of wood veneers 7 situated next to each other can be applied instead of veneers which are composed, via a sewing connection, to a continuous sheet. Preferably, between the wood veneers 7 a space is maintained at the location of the portion 32. The dashed line 36 represents a continuous sheet.

FIG. 11 further also represents that there are similar options for the glue layer at the underside and for the backing layer 11.

Referring to FIGS. 9 to 11, it is clear that the press treatment preferably is performed on a larger basic board 8A, which finally shall be subdivided into a plurality of floor panels 1. In transverse direction as well as in longitudinal direction, a plurality of floor panels 1 lying next to each other can be formed from the larger basic board 8A. The portions 32 of the basic board 8A can be present between adjacent long edges 4-5 as well as between adjacent short edges 2-3 of the final floor panels 1.

FIG. 12 represents a particular embodiment, wherein the hard particles 27 assume an orientation wherein their largest main axis of inertia or main axis 37, seen on average, is oriented substantially perpendicular to the surface 38 of the panel 1.

It is also noted that impregnatable carrier sheets provided with oriented hard particles as such relate to a fourth independent aspect of the invention, which can be applied more broadly than only as a glue layer in a veneer panel. So, for example, may such carrier sheet be applied as a decor layer or overlay in a laminate panel. It is known that laminate panels comprise a melamine-based top layer, which usually is composed of a decor paper printed with a motif and provided with resin, and a protective top layer or overlay, which is provided above the motif, which also can comprise a transparent paper layer. The overlay usually comprises hard particles for forming a barrier against wear above the motif of the decor paper. As oriented particles offer more effective resistance against wear, according to the present independent aspect of the invention, the content of hard particles can be limited compared to the state of the art. In this manner, a more transparent top layer can be obtained above the decor layer or the decor paper of a laminate panel. Therefore, it is clear that the invention, according to its fourth independent aspect, also relates to a carrier sheet, wherein this carrier sheet is impregnable, or is impregnated, with melamine-based resin and is provided with hard particles, with the characteristic that said hard particles assume an orientation wherein their largest main axis of inertia or main axis, seen on average, is oriented substantially perpendicular to the surface of the carrier sheet. It is clear that the hard particles, which are applied within the scope of the fourth aspect, can consist of the same materials as in the remaining aspects. Preferably, the hard particles, however, show a more limited average particle size, for example, situated between 20 and 120 micrometers. The carrier sheet preferably is a paper sheet, preferably with a Gurley value (according to Tappi T460) lower than 30 seconds, or even of lower than 25 seconds. Such Gurley value ensures a sufficient impregnation with melamine-based resin. The paper sheet can show a paper weight between 15 and 150 grams per square meter. In case the paper sheet is employed as a decor paper, namely, with a provided thereon printed motif, it preferably has a weight of more than 55 grams per square meter, wherein approximately 70 to approximately 90 grams per square meter is a good value for application in laminate floor panels and 90 to 150 grams per square meter is a good value for application in furniture panels. In the case that the paper sheet is employed as a wear layer, or so-called overlay, above a decor paper, it preferably has a weight of less than 55 grams per square meter, wherein approximately 20 to approximately 30 grams per square meter is a good value. Preferably, 5 to 25 grams per square meter of said hard particles is applied to the carrier sheet. It is evident that for the orientation of the hard particles the techniques can be applied which have been discussed by means of the second aspect of the invention.

It is clear that the invention also relates to a laminate panel, more particularly a laminate floor panel, wherein this laminate panel comprises at least a substrate, for example, of MDF or HDF, and a provided there above decor with a protective top layer or wear layer, with the characteristic that the decor and/or the wear layer comprises a carrier sheet with the characteristics of the fourth aspect.

The present invention is in no way limited to the herein above-described embodiments, on the contrary can such methods and decorative panels be realized according to various variants, without leaving the scope of the present invention. Amongst others, it is clear that the characteristics of the invention of any aspect also are interesting with other decorative panels, such as furniture panels, wall panels or ceiling panels. So, for example, does the invention offer the possibility for more wear-resistant counter tops for kitchens, office furniture, tables and the like, which comprise only a thin veneer layer as a decorative layer.

Although in the above practically exclusively wood veneer is mentioned, it is evident that the above independent aspects and preferred embodiments thereof also are applied in decorative panels with a thin top layer of another material. So, for example, it can be applied in decorative top layers of leather, bamboo, textile, aluminum, metal, stone veneer, plastic foils or the like.

The invention claimed is:

1. A floor panel with a substrate, and a decorative layer of wood veneer with a thickness of 1 millimeter or less and provided on the substrate,
   wherein said decorative layer is provided on the substrate by means of a glue layer situated between the substrate and the decorative layer,
   wherein said glue layer comprises hard particles with an average particle size at least one third of the thickness of the wood veneer,
   wherein the hard particles penetrate into the wood veneer into an underside of the wood veneer, over a distance of at least 20% of the thickness of the wood veneer; and
   wherein the material of the hard particles is chosen from a group consisting of aluminum oxide, titanium carbide, silicon carbide and silicon oxide.

2. The floor panel according to claim 1, wherein the hard particles penetrate into the wood veneer at the underside of the veneer, for 30% by weight or more of the hard particles.

3. The floor panel according to claim 1, wherein at least 40 hard particles per square centimeter, penetrate into the wood veneer.

4. The floor panel according to claim 1, wherein less than 1 hard particle per square centimeter completely penetrate through the wood veneer.

5. The floor panel according to claim 1, wherein the wood veneer has a thickness between 0.3 and 1 millimeter.

6. The floor panel according to claim 1, wherein the decorative layer comprises a transparent or translucent surface material at a surface of the floor panel.

7. The floor panel according to claim 1, wherein the glue layer is a layer including a glue, and the wood veneer is impregnated by means of the glue.

8. The floor panel according to claim 7, wherein the glue penetrates nowhere further than over a distance smaller than 50% of the thickness of the wood veneer.

9. The floor panel according to claim 1, wherein the hard particles define an orientation wherein a largest main axis of inertia or an average main axis is oriented substantially perpendicular to the surface of the panel.

10. The floor panel according to claim 1, wherein the glue layer extends uninterruptedly underneath an entirety of the wood veneer.

11. The floor panel according to claim 1, wherein the substrate, at the surface where the decorative layer is situated, has a density of more than 900 kilograms per cubic meter.

12. The floor panel according to claim 1, wherein the glue layer is a layer including thermosetting resin.

13. The floor panel according to claim 1, wherein the substrate is a wood fiberboard.

14. The floor panel according to claim 1, wherein the floor panel, on at least two opposite edges is provided with coupling means, which allow that two of such floor panels can be coupled to each other in a vertical direction perpendicular to a plane of the coupled panels and in a horizontal direction in the plane and perpendicular to the respective edge.

* * * * *